United States Patent
Barnett et al.

(10) Patent No.: US 7,918,592 B2
(45) Date of Patent: Apr. 5, 2011

(54) INTEGRATED POSITION LIGHT OVERLAP BAFFLES

(75) Inventors: David Barnett, Urbana, OH (US);
Lawrence M. Rice, Urbana, OH (US);
Timothy C. Martin, Urbana, OH (US)

(73) Assignee: Honeywell International Inc., Morristown, NJ (US)

(*) Notice: Subject to any disclaimer, the term of this patent is extended or adjusted under 35 U.S.C. 154(b) by 287 days.

(21) Appl. No.: 12/180,298

(22) Filed: Jul. 25, 2008

(65) Prior Publication Data

US 2010/0020556 A1      Jan. 28, 2010

(51) Int. Cl.
*B64D 47/06* (2006.01)
(52) U.S. Cl. ... 362/470; 362/545; 362/248; 362/249.11; 362/249.02; 362/800
(58) Field of Classification Search .................. 362/470, 362/544–546, 248, 249.01, 249.11, 11, 235, 362/241–243, 249.02, 341, 344
See application file for complete search history.

(56) References Cited

U.S. PATENT DOCUMENTS

| | | | |
|---|---|---|---|
| 4,495,549 A | 1/1985 | Carlson et al. | |
| 6,598,996 B1 * | 7/2003 | Lodhie | 362/249.05 |
| 7,055,994 B2 | 6/2006 | Martin | |
| 7,316,488 B2 | 1/2008 | Wall, Jr. | |
| 2005/0122727 A1 | 6/2005 | Machi et al. | |
| 2005/0201112 A1 | 9/2005 | Machi et al. | |

\* cited by examiner

*Primary Examiner* — Jong-Suk (James) Lee
*Assistant Examiner* — Leah S Lovell
(74) *Attorney, Agent, or Firm* — Black Lowe & Graham PLLC

(57) ABSTRACT

A position light including a base that is configured to attach to an aircraft. The base having an extruded overlap baffle. A first LED is coupled to the base underneath the overlap baffle. A circuit card is also coupled to the base and is extended over the first LED toward the over flap baffle. A second LED coupled to a circuit card. The extended overlap baffle and the extended circuit card block visible light emitting from the first LED.

18 Claims, 2 Drawing Sheets

INTEGRATED POSITION LIGHT OVERLAP BAFFLES

BACKGROUND OF THE INVENTION

There is a requirement in aircraft position lights to limit light output in "overlap" areas of the photometric pattern. FIG. 2 shows an example of how position lights are supposed to appear under current flight rules. The position lights consist of an aviation red light 22 on the left (port) side and an aviation green light 24 on the right (starboard) and an aviation white taillight 26. This is done to prevent ambiguity in the light signal projected and to clarify the spatial orientation of the aircraft being observed.

Historically, lights have utilized a number of different baffle designs to accomplish the function of creating the light cut off for the overlap limit. One such design was to add additional parts to the light in order to block the light. Attaching additional parts to a light for the purpose of baffling creates extra costs due to extra components and the need to assemble the parts. Position accuracy may be impacted by tolerance stack up. The additional mechanical interfaces may cause vibration failures. An alternative method used, is to use opaque finishes on areas of lenses. Abrasion resistant opaque finishes for glass lenses are expensive, and baffle position in the finished part is not as consistent as desired. Finish adhesion is not always good. Opaque finishes on plastic lenses have presented similar difficulties.

SUMMARY OF THE INVENTION

The present invention provides a position light including a base configured to attach to an aircraft. The base has an extruded overlap baffle. A first LED is coupled to the base underneath the overlap baffle. A circuit card is also coupled to the base and is extended over the first LED toward the overlap baffle. A second LED coupled to a circuit card. The extended overlap baffle and the extended circuit card block visible light emitting from the first LED.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
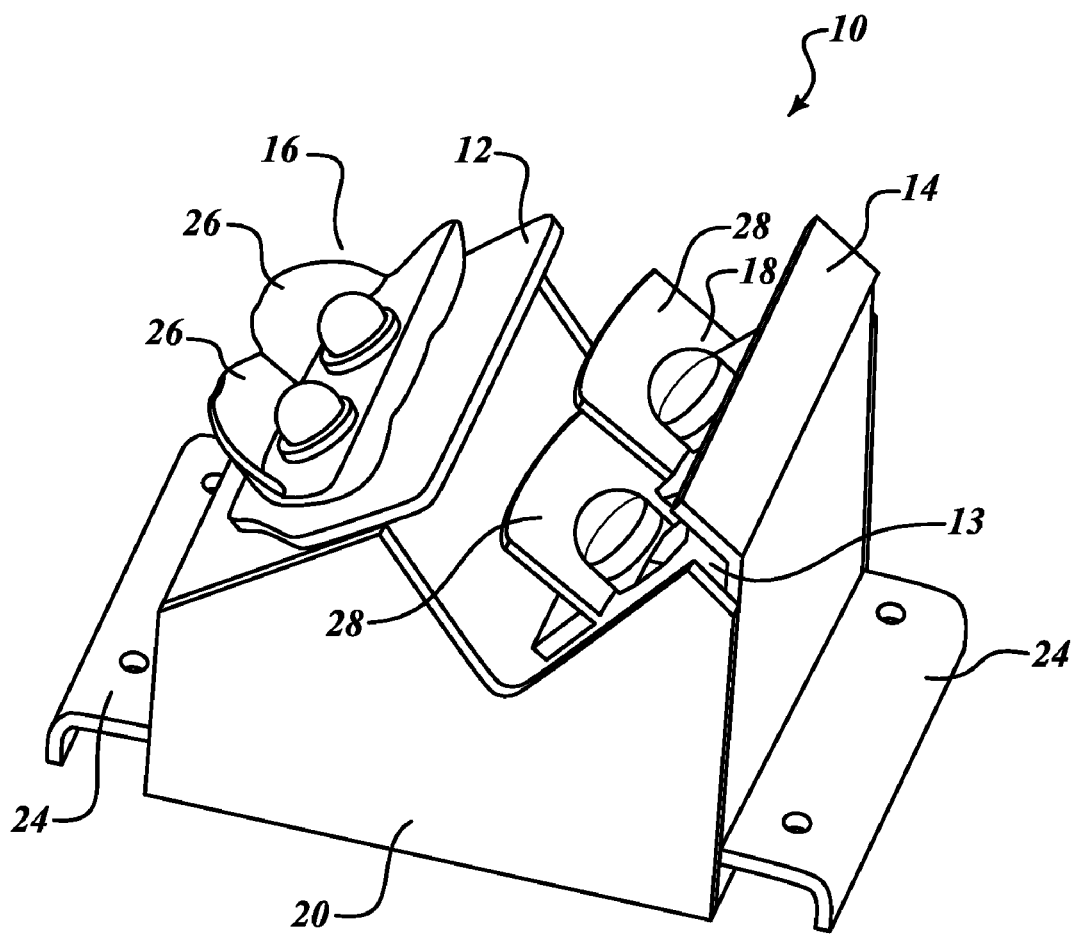
FIG. 1 shows an example position light with integrated overlap baffles.
Figure 2:
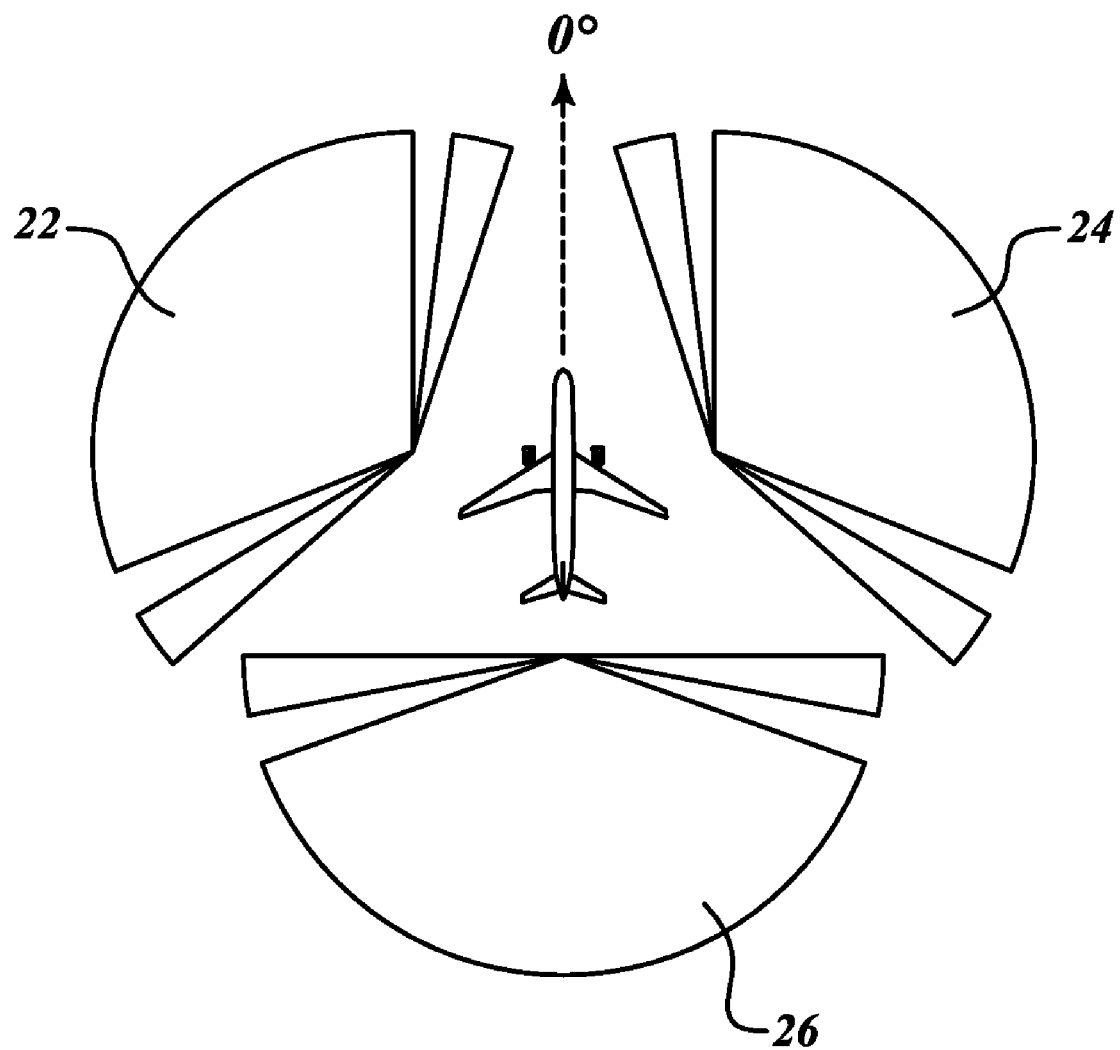
FIG. 2 shows an example of how position lights are supposed to appear under current flight rules.

FIG. 1 shows an example position light 10 with integrated overlap baffles. In one embodiment, the position light 10 is made out of aluminum, in alternate embodiments the position light 10 is made of composite plastic materials. The position light 10 includes a light body 20 which contains attaching means and controls the LED's 16 and 18 using a first and second circuit card 12 and 13.

The body 20 includes a heat sink 24 in alternate embodiments. The LED's 16 and 18 display position lighting from a wing of an aircraft. In a first embodiment, an inboard overlap baffle 14 blocks LED 18 in the red to green overlap areas. The LED 18 produces a red or green light depending on its location on the aircraft. The inboard overlap baffle 14 is extruded as part of the body 20. The overlap baffle 14 is integrated as a piece of the body 20 and therefore does not include additional screws, parts or other attaching means.

A circuit card 12 baffle is used to block light from LED 16 in the red-white or green-white overlap areas. The circuit card 12 is extended in length to cover the needed area while allowing good access to other parts before the circuit card 12 baffle is attached. The circuit card 12 is coupled to the body 20. The circuit card 12 baffle is already a piece of the position light 10 and therefore does not add additional weight or expense by extending it over the LED 16.

Integrated baffles (or reflectors) 26, 28 are positioned on the respective circuit card behind the LEDs 16, 18.

The present invention provides integrated position light overlap baffles. Embodiments of the present invention integrate baffles with other parts already present on the lighting system. For example a circuit card used to power and operate the light emitting diodes (LED's) may be extended to also block the light from surrounding areas.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A position light comprising:
    a base configured to attach to a wing of an aircraft, the base having an extruded overlap baffle, the extruded overlap baffle extending over a depressed area of the base only in a forward position relative to the aircraft;
    a first LED coupled to depressed area of the base;
    a circuit card coupled to the base, the circuit card extended over the depressed area of the base only in an aft position relative to the aircraft;
    a second LED coupled to the circuit card; and
    wherein the extruded overlap baffle and the circuit card block visible light emitting from the first LED.

2. The position light of claim 1, wherein the overlap baffle is integrated with the base.

3. The position light of claim 1, wherein the circuit card is shifted to extend over the first LED.

4. The position light of claim 1, wherein the position light further comprises a heat sink.

5. The position light of claim 1, wherein the position light comprises aluminum.

6. The position light of claim 1, wherein the position light comprises a composite plastic.

7. The position light of claim 1, wherein the first LED comprises integrated baffles.

8. The position light of claim 1, wherein the second LED comprises integrated baffles.

9. The position light of claim 1, wherein the first LED produces at least one of a red or green light.

10. The position light of claim 1, wherein the second LED produces a white light.

11. A position light comprising:
    a baffle extending inboard from a base, the base configured to couple to a wing of an aircraft;
    a circuit card coupled to the base and spaced apart from the baffle, the circuit card extending inwardly towards the baffle;
    a first set of one or more LEDs attached to a depressed area of the base and at least partially covered by the circuit card in an aft direction relative to the aircraft and the baffle in a forward direction relative to the aircraft; and a second set of one or more LEDs attached to the circuit card.

12. The position light of claim 11, wherein the overlap baffle is integrated with the base.

13. The position light of claim 11, wherein the circuit card is shifted to extend over at least a portion of the first set of one or more LEDs.

14. The position light of claim 11, wherein the position light further comprises a heat sink.

15. The position light of claim 11, wherein the position light comprises aluminum.

16. The position light of claim 11, wherein the position light comprises a composite plastic.

17. The position light of claim 11, wherein the first set of one or more LEDs comprises integrated baffles.

18. The position light of claim 11, wherein the second set of one or more LEDs comprises integrated baffles.

* * * * *